Oct. 11, 1927.

F. T. HAGUE 1,645,281

CONTROL OF COMMUTATING POLE STRENGTH ON NONBOOSTER ROTARY CONVERTERS

Filed Sept. 23, 1922

WITNESSES:

INVENTOR
Floyd T. Hague
BY
ATTORNEY

Patented Oct. 11, 1927.

1,645,281

UNITED STATES PATENT OFFICE.

FLOYD T. HAGUE, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL OF COMMUTATING-POLE STRENGTH ON NONBOOSTER ROTARY CONVERTERS.

Application filed September 23, 1922. Serial No. 590,147.

My invention relates to methods of and means for improving the commutation of commutating dynamo-electric machines and it has particular reference to rotary converters.

The object of my invention is to compensate for the variable effects produced by the wattless component of the alternating current flowing in the armature of a rotary converter.

Another object of my invention is to compensate for the effect of variations in the angular position of the rotor of a rotary converter with regard to its effect upon the armature reaction in the commutating zone.

With these and other objects in view, my invention consists in the methods and apparatus hereinafter disclosed and specifically recited in the appended claims.

Figure 1:
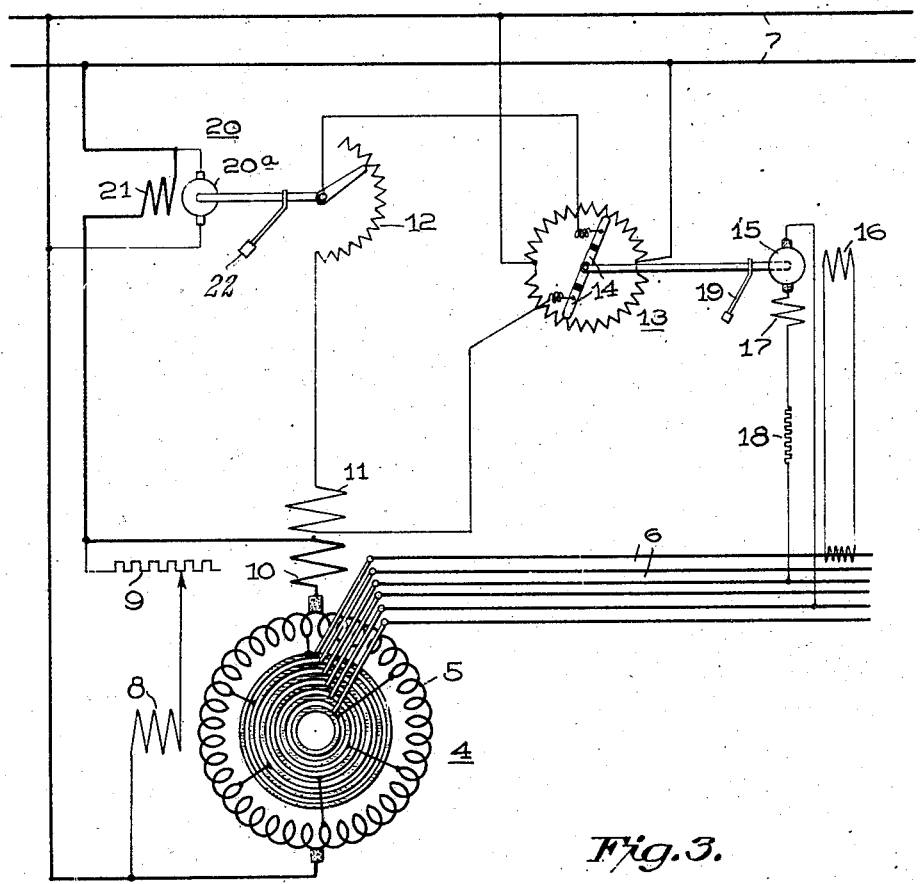
Figure 2:
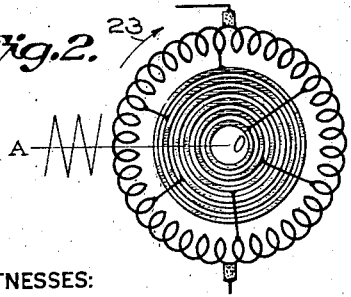
Figure 3:
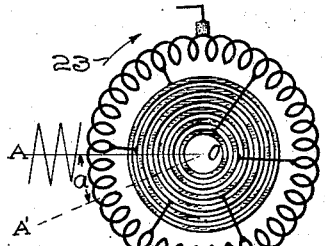

Referring to the accompanying drawing for a better understanding of my invention, Fig. 1 is a diagrammatic view of circuits and apparatus embodying my invention in what is believed to be a preferred form, and Figs. 2 and 3 are diagrammatic views illustrating the changes in the position of the rotor with varying loads.

I have found that the application of a load to a rotary converter causes an angular displacement of the rotor with respect to its no-load position, the angular displacement varying approximately with the load. It follows, therefore, that the wattless component of current, instead of exerting its magnetomotive force wholly against or with that of the exciting field, will have a component along the interpole axis. This will produce an effect on the commutating-pole fluxes, either increasing or decreasing them, depending upon the angular displacement of the rotor.

My invention, generally stated, therefore, is built upon the idea of effecting a compensation varying both with the rotor position and with the reactive component.

In Fig. 1 is shown a rotary converter 4 having an armature 5 which is connected to an alternating-current line 6 and to a direct-current line 7. The converter is also provided with three field windings, to-wit: an exciting winding 8 which is connected across the direct-current line through a rheostat 9, a series commutating field winding 10 and an auxiliary commutating field winding 11.

The auxiliary winding 11 is excited, through a variable resistor 12, from a source of electromotive force which varies with the wattless component of the alternating current supplied to the converter. In the form shown in the drawing, the variable source is illustrated in the form of a double-dial rheostat 13 having its terminals connected across the direct-current line 7 and having a movable arm 14 for making contact with the respective rheostat dials.

The position of the movable arm 14 is controlled by means of a so-called "torque motor" which consists of a single-phase commutator motor having an armature 15, an exciting winding 16 and a compensating winding 17. The armature 15 and compensating winding 17 are connected, through a resistor 18, across two phases of the alternating-current line 6. The exciting winding 16 is energized from a current transformer in another phase of the alternating-current line in such manner that the torque motor responds to the wattless component of the current in the alternating-current line.

A weight-arm 19 or other biasing means, such as a spring or springs, is employed to produce a varying torque on the shaft of the torque motor tending to return the same to normal position. The resistances of the rheostat 13 are so chosen in value that the electromotive forces at the terminals of the movable arm 14 are substantially proportional, in direction and magnitude, to the wattless component of the alternating current.

The variable resistor 12, which is connected in series between the auxiliary commutating winding 11 and the double-dial rheostat 13, is controlled by means of another torque motor 20 comprising an armature member 20a which is energized across the direct-current line and a direct-current field winding 21 which is connected in series with one of the direct-current terminal leads of the converter 4. While a series connection is shown, it will be understood that a current shunt of any kind may be employed, as will be obvious to those skilled in the art. A biasing weight-arm 22 is mounted on the shaft of the torque motor 20 to oppose the variable torque developed in the torque motor. The resistances of the variable resistor 12 are so chosen that the total resistance of the circuit, including the auxiliary commutating winding 11, varies inversely with the load changes to compensate for the angular displacement of the rotor member of the converter in the manner hereinbefore indicated as necessary for perfect compensation.

The effect of an alteration in the angular position of the rotor will be understood by reference to Figs. 2 and 3. Since the field produced by the alternating currents flowing in the armature of the rotary converter rotates backwardly at synchronous speed, it is held stationary in space. Under no-load conditions, as depicted in Fig. 2, a south pole of the armature will be substantially underneath a north pole of the field-magnet excitation, and the relative positions of the stator and rotor fluxes at unity power factor may be indicated by a single line OA.

Under load conditions, with the armature rotating in the direction of the arrow 23, the armature will drop back by an angle $a$ so that the field excitation will be represented by the line OA and the alternating-current armature reaction at unity power factor will be represented by the line OA'. If it were not for the angular displacement $a$, the effect of wattless currents flowing in the armature 5 would be either to increase or to decrease the excitation of the machine along the axis OA, as is well understood. When the armature is displaced by an angle $a$, however, there will be a component of the armature reaction proportional to sine $a$ in the direction of the center line of the interpoles, thus tending to change the flux in the commutating zone.

By means of the apparatus comprising my invention, I am able to produce an electromotive force which is, at all times, directly proportional to the wattless component of the alternating current whereby the excitation of the auxiliary commutating winding 11 may be controlled in accordance therewith. However, when the direct-current load is heavy, the resistance of the variable resistor 12 is reduced, whereas, under light-load conditions, the resistance is increased, thus causing the current in the auxiliary commutating winding 11 to vary with the product of the wattless alternating-current component and a function of the load.

While I have shown my invention in a preferred form, it will be obvious that many changes and substitutions of equivalents may be made by those skilled in the art without departing from the essential features of my invention. I do not desire, therefore, to be limited to the specific construction shown except in so far as may be required by the language of the appended claims when read in the light of the prior art.

I claim as my invention:

1. A method of obtaining good commutation in a rotary converter provided with commutating poles, which consists in varying the strength of the commutating field in response to the wattless alternating-current component, and in simultaneously varying the strength of the commutating field in response to the real-power load to compensate for the variation in the angular displacement and intensity of the armature field.

2. The combination with a rotary converter provided with commutating poles, of electro-responsive means for varying the strength of the commutating field in response to the wattless alternating-current component, and electro-responsive means for simultaneously varying the strength of the commutating field in response to the real-power load to compensate for the variation in the angular displacement and intensity of the armature field.

3. The combination with a rotary converter, of mechanism for improving the commutation thereof, said mechanism comprising a commutating field winding, a variable resistor in series therewith, means responsive to the total load current for varying said resistor, a source of variable electromotive force for said commutating winding and resistor, and means responsive to the wattless component of the alternating current for varying said electromotive force.

4. The combination with a rotary converter, of a main commutating field winding energized in accordance with the total load current, an auxiliary commutating field winding, a source of variable electromotive force for said auxiliary winding, electro-responsive means for causing said electromotive force to vary in magnitude and direction in response to the wattless component of the alternating current, and a variable-resistance means for causing the current supplied to said auxiliary winding by said source to vary in accordance with a predetermined function of the load.

5. The combination with a rotary converter, of mechanism for improving the commutation thereof, said mechanism comprising a commutating field winding, a source of variable electromotive force, and a variable resistor, said variable source and variable resistor constituting variable quantities which may be controlled to variably excite said commutating field winding, electro-responsive means for varying one of said quantities in accordance with variations in a disturbing factor, said factor introducing components of armature reaction having a variable effectiveness dependent upon the angular displacement of the rotating field of the armature member relative to the field member, and electro-responsive means for altering the other of said quantities in a predetermined manner in response to the load.

In testimony whereof, I have hereunto subscribed my name this 18th day of September 1922.

FLOYD T. HAGUE.